US008964665B2

(12) United States Patent
Wong (10) Patent No.: US 8,964,665 B2
(45) Date of Patent: Feb. 24, 2015

(54) METHOD OF REPORTING SCHEDULING INFORMATION (75) Inventor: Shin Horng Wong, Wiltshire (GB)

(73) Assignee: Alcatel Lucent, Boulogne-Billancourt (FR)

( * ) Notice: Subject to any disclaimer, the term of this patent is extended or adjusted under 35 U.S.C. 154(b) by 148 days.

(21) Appl. No.: 13/389,743

(22) PCT Filed: Jul. 22, 2010

(86) PCT No.: PCT/EP2010/004590
§ 371 (c)(1),
(2), (4) Date: Apr. 23, 2012

(87) PCT Pub. No.: WO2011/018160
PCT Pub. Date: Feb. 17, 2011

(65) Prior Publication Data
US 2012/0201211 A1 Aug. 9, 2012

(30) Foreign Application Priority Data
Aug. 12, 2009 (EP) .................................. 09360038

(51) Int. Cl.
*H04W 4/00* (2009.01)
*H04L 1/04* (2006.01)
(Continued)

(52) U.S. Cl.
CPC ............... *H04L 1/04* (2013.01); *H04L 1/0027* (2013.01); *H04L 1/0028* (2013.01); *H04W 52/367* (2013.01); *H04W 72/1284* (2013.01); *H04L 5/0053* (2013.01); *H04W 52/16* (2013.01)
USPC ........... 370/329; 370/241; 370/252; 370/332; 370/338; 370/431; 455/67.11; 455/436; 455/440; 455/574

(58) Field of Classification Search
CPC ..................................................... H04L 1/0027
USPC ................. 370/241, 252, 329, 332–338, 431; 455/67.11, 436, 440, 574
See application file for complete search history.

(56) References Cited

U.S. PATENT DOCUMENTS 6,584,330 B1 * 6/2003 Ruuska .......................... 455/574
6,611,506 B1 * 8/2003 Huang et al. .................. 370/329
(Continued)

FOREIGN PATENT DOCUMENTS

| CN | 1780478 A | 5/2006 |
| CN | 101116265 A | 1/2008 |

(Continued)

OTHER PUBLICATIONS

Huawei, "Consideration on SI for DC-HSUPA," 3$^{rd}$ Generation Partnership Project (3GPP), 3GPP TSG RAN WG2 Meeting #66, San Francisco, USA, R2-093152, XP050340869, May 4-8, 2009.
(Continued)

*Primary Examiner* — Andrew Lai
*Assistant Examiner* — Andrew C Lee
(74) *Attorney, Agent, or Firm* — Fay Sharpe, LLP (57) ABSTRACT

A method of encoding and transmitting information relating to data to be transmitted from user equipment to a base station in a multi-carrier wireless telecommunications network. Each carrier comprises a data channel. The method comprises the steps of: generating an indication of the characteristics of said data to be transmitted; determining an indication of estimated power available to send data on said data channel of each carrier; and encoding a scheduling information message for each carrier, said scheduling information message being generated from the indication of estimated power available to send data on said data channel of that carrier and the characteristics of said data to be transmitted. The encoded scheduling information message for each carrier is transmitted to the base station on two or more carriers.

16 Claims, 4 Drawing Sheets

(51) Int. Cl.
*H04L 1/00* (2006.01)
*H04W 52/36* (2009.01)
*H04W 72/12* (2009.01)
*H04L 5/00* (2006.01)
*H04W 52/16* (2009.01)

(56) References Cited

U.S. PATENT DOCUMENTS

| | | | | |
|---|---|---|---|---|
| 7,545,763 | B2* | 6/2009 | Wunder et al. | 370/319 |
| 7,813,272 | B2* | 10/2010 | Seki | 370/229 |
| 7,912,135 | B2* | 3/2011 | Kwak et al. | 375/260 |
| 7,920,525 | B2* | 4/2011 | Kim et al. | 370/332 |
| 8,085,683 | B2* | 12/2011 | Leith et al. | 370/252 |
| 8,150,478 | B2* | 4/2012 | Perets et al. | 455/574 |
| 2002/0085641 | A1 | 7/2002 | Baum | |
| 2005/0207367 | A1* | 9/2005 | Onggosanusi et al. | 370/315 |
| 2006/0183441 | A1* | 8/2006 | Irie et al. | 455/115.1 |
| 2006/0285523 | A1* | 12/2006 | Ishii et al. | 370/335 |
| 2007/0070908 | A1 | 3/2007 | Ghosh et al. | |
| 2007/0091888 | A1* | 4/2007 | Koide et al. | 370/389 |
| 2008/0008135 | A1* | 1/2008 | Saito et al. | 370/335 |
| 2008/0009306 | A1* | 1/2008 | Suga et al. | 455/522 |
| 2008/0102822 | A1* | 5/2008 | Feng et al. | 455/425 |
| 2008/0182580 | A1* | 7/2008 | Laroia et al. | 455/440 |
| 2008/0316969 | A1 | 12/2008 | Prakash et al. | |
| 2009/0010213 | A1* | 1/2009 | Yamada et al. | 370/329 |
| 2009/0093255 | A1* | 4/2009 | Balasubramanian | 455/450 |
| 2009/0163208 | A1* | 6/2009 | Rao | 455/436 |
| 2009/0196196 | A1* | 8/2009 | Ghosh et al. | 370/252 |
| 2009/0245207 | A1* | 10/2009 | Rao | 370/332 |
| 2009/0257387 | A1 | 10/2009 | Gholmieh et al. | |
| 2009/0296595 | A1 | 12/2009 | Khoshnevis et al. | |
| 2009/0325626 | A1* | 12/2009 | Palanki et al. | 455/522 |
| 2010/0067494 | A1 | 3/2010 | Chin et al. | |
| 2010/0081442 | A1 | 4/2010 | Kronestedt et al. | |
| 2010/0086088 | A1* | 4/2010 | Lie et al. | 375/346 |
| 2010/0273515 | A1 | 10/2010 | Fabien et al. | |
| 2010/0290406 | A1* | 11/2010 | Miki et al. | 370/329 |

FOREIGN PATENT DOCUMENTS

| | | |
|---|---|---|
| CN | 101491153 A | 7/2009 |
| EP | 2034761 A1 | 3/2009 |
| WO | WO 2006/019441 A1 | 2/2006 |
| WO | WO 2007/038729 A2 | 4/2007 |

OTHER PUBLICATIONS

Nokia Corporation et al., "UPH Reporting in Dual Carrier HSUPA," 3$^{rd}$ Generation Partnership Project (3GPP), 3GPP TSG-RAN WG2 Meeting #66, San Francisco, USA, R2-093103, XP050340845, May 4-8, 2009.

Samsung, "Open UP issues in DC-HSUPA," 3$^{rd}$ Generation Partnership Project (3GPP), 3GPP TSG RAN WG2#66, San Francisco, USA, R2-093267, XP050340945, May 4-8, 2009.

International Search Report for PCT/EP2010/004590 dated Oct. 20, 2010.

Chinese Office Action dated Apr. 1, 2014 (English translation attached).

US Office Action for U.S. Appl. No. 14/334,725, filed Jul. 18, 2014.

* cited by examiner

METHOD OF REPORTING SCHEDULING INFORMATION

FIELD OF INVENTION

The present invention relates to a method of encoding and transmitting information relating to data to be transmitted from user equipment to a base station in a multi-carrier wireless telecommunications network, user equipment operable to carry out the method and a computer program product operable to carry out the method.

BACKGROUND

Wireless telecommunications systems are known. In known systems, radio coverage is provided to user equipment, for example, mobile telephones, by geographical areas known as cells. A base station is located in each cell to provide the required radio coverage. User equipment in each cell receives information and data from the base station and transmits information and data to the base station.

Information and data transmitted by the base station to the user equipment occurs on channels of radio carriers known as downlink carriers. Information and data transmitted by user equipment to the base station occurs on uplink data channels of radio carriers known as uplink carriers.

In known single uplink carrier wireless telecommunications systems, user equipment is operable to transmit data to a base station in packets. In such an arrangement, one or more Enhanced Dedicated Channel (E-DCH) dedicated physical data channels (E-DPDCH) are used to carry data from user equipment to a base station. The data throughput of a particular user equipment is determined by the transport block size carried by the one or more E-DPDCH channels per transport time interval (TTI). The transport block size sustainable on a data channel is dependent upon an allocated amount of power which that user equipment has been granted permission to use by a base station. More particularly, the amount of power the user equipment is allowed to use on a particular channel is determined by the base station in conjunction with a Radio Network Controller (RNC). The RNC sets parameters within which the network is to operate and the base station communicates with the user equipment to dictate the operation of the user equipment to meet the parameters set by the RNC.

In order for user equipment to allocate a power and therefore a transport block size to the carrier, it must receive a 'grant' of radio resource from a base station. In order to calculate a grant, a base station collects initial information from user equipment. The information sent from the user equipment to the base station for this task is known as a "scheduling information" (SI) message. A scheduling information message in a single carrier telecommunications network typically includes information relating to the characteristics of data to be sent from the user equipment to the base station and an indication representative of power the user equipment has available for data transmission to the base station.

A known scheduling information message comprises an encoded message sent to a base station by user equipment. A known SI message typically comprises 18 bits. The 18 bits include 5 bits which indicate the remaining power that the user equipment can use for data transmission. That information is known as the user equipment power headroom or UPH. The 18 bits further comprise 5 bits which indicate the total quantity of data in a transmission buffer of the user equipment. That information is known as the total enhanced data channel buffer status (TEBS). The 18 bit message further comprises 4 bits to indicate which logical channel having data in the user equipment transmission buffer has highest priority, and an indication of that priority. That information is known as the highest priority logical channel ID (HUD). The SI message also comprises 4 bits indicating the quantity of data in the buffer for the logical channel having the highest priority. That information is known as the highest priority logical channel buffer status (HLBS).

The total enhanced data channel buffer status (TEBS), the highest priority logical channel ID (HLID) and the highest priority logical channel buffer status (HLBS) all relate to the data to be transmitted from user equipment to a base station and are known collectively as "user equipment buffer information". From the user equipment buffer information and the user equipment power head room (UPH), a base station can determine resource allowable for each user equipment, which indirectly determines power allocatable and a transport block size which can be transmitted by the data channel of the user equipment. A user equipment transmits user equipment buffer information and UPH encoded in the scheduling information message to a base station in order to be scheduled resource on which to efficiently transmit the complete data in the user equipment buffer to the base station.

It is proposed to allow user equipment to transmit simultaneously on more than one carrier. Each carrier is typically independently power controlled and independently scheduled by a base station. In such an arrangement, user equipment may be able to transmit data simultaneously on more than one carrier to the base station. A wireless telecommunications network allowing for user equipment to transmit on two or more carriers simultaneously, or a base station to transmit simultaneously on two or more carriers is known as a "multi-carrier" network. Such multi-carrier wireless telecommunications networks may provide two carriers, and may be referred to as a "dual cell high speed up link packet access" (DC-HSUPA) network. Networks having more than two carriers may be referred to as "multi cell high speed up link packet access" (MC-HSUPA) networks. The term "multi-carrier" network used herein is envisaged to cover both DC-HSUPA and MC-HSUPA networks.

Accordingly, it is desired to provide an improved technique to encoding and transmitting information relating to data to be transmitted from user equipment to a base station in a multi-carrier wireless telecommunications network.

SUMMARY

A first aspect provides a method of encoding and transmitting information relating to data to be transmitted from user equipment to a base station in a multi-carrier wireless telecommunications network, each carrier comprising a data channel, said method comprising the steps of:
  generating an indication of a characteristic of said data to be transmitted,
  determining an indication of estimated power available to send data on said data channel of each carrier,
  encoding a scheduling information message for each carrier, said scheduling information message being generated from the indication of estimated power available to send data on said data channel of that carrier and the characteristics of said data to be transmitted,
  transmitting said encoded scheduling information message for each carrier to the base station on two or more carriers.

The first aspect recognises that in a wireless telecommunications network it is possible to increase data uplink throughput by allowing user equipment to simultaneously transmit data on two or more carrier frequencies.

In such a multi-carrier wireless telecommunications network, user equipment is required to transmit information relating to: characteristics of data to be transmitted to a base station, and also information relating to estimated power available to send data on a data channel of each of the available carriers, so that a base station can allocate resource to each carrier.

Typically, each carrier in a multi-carrier network will be independently power controlled. Furthermore, each carrier will typically experience different radio condition and will therefore have different resources scheduled by a base station. The radio condition experienced by a carrier tends to be indicative of any environmental advantages being experienced by a radio signal having a particular carrier frequency. Resources scheduled by a base station to a particular carrier offer some indication of the status of broader conditions being experienced by the wireless communications network on that carrier in a particular geographical area served by that base station.

In order for a multi-carrier wireless telecommunications network to function efficiently, it is necessary for a base station to consider how best to allocate power or data amongst the available carriers. In particular, it is necessary to try and ensure efficient data throughput from user equipment to the base station is achieved on uplink data channels. User equipment is therefore required to transmit information relating to one or more characteristics of the data to be transmitted and, for each carrier, an indication of the estimated power available to send data on a channel of that carrier on that user equipment. The user equipment must therefore create and transmit an initial transmission to a base station, that transmission comprising a scheduling information message which efficiently conveys a characteristic of common buffer status together with information relating to each available carrier.

It will be appreciated that in a multi-carrier wireless telecommunications network it is likely that the data to be transmitted will be common to all carriers, but that information relating to the estimated power for each carrier will differ. As a result the encoded scheduling information message for each carrier will differ.

In a multi-carrier wireless telecommunications network one of the uplink carriers provided by a user equipment is typically known as primary or "anchor" carrier.

It is possible to transmit two or more independent carrier user equipment power headroom indications (representative of an indication of estimated power available to send data on a data channel of each carrier) in a single concatenated scheduling information message. It would therefore be possible to transmit a single scheduling information message on only one carrier, for example an anchor carrier, which contained information relating to the power headroom available on each available carrier. Such a method would typically transmit information relating to a characteristic of the data to be transmitted by user equipment (such as user equipment buffer information referred to above) only once, and thus arguably avoids redundant re-transmission of that information. In effect, such a method concatenates information relating to power headroom of each carrier into a single scheduling information message.

Transmission of two or more independent user equipment power headroom pieces of information in one scheduling information message in accordance with such a concatenated approach would, however, require a format change to the known format of a typical scheduling information message. In particular, it would require more bits to adequately convey the user equipment status in relation to power available on each available carrier. Furthermore, if only one carrier is activated for any reason, user equipment will be forced to transmit redundant "empty" bits for any other carriers allowed for by the new standard format scheduling information message. It will be appreciated that such a method cannot be easily scaled to deal with a general multi-carrier arrangement: each time the number of carriers is increased, an increase in the size of the scheduling information message, and in particular the part of that message is responsible for indicating an estimate of power available on each carrier, would be required.

It is also possible to encode and transmit an independent scheduling information message for each carrier. Those independent scheduling information messages may be transmitted on a single carrier, typically the anchor carrier. In such a method, information relating to each carrier is sent consecutively to the base station from the user equipment. In such a method, the user equipment power headroom calculated for each available carrier forms part of an independent scheduling information message generated for each carrier. Those independent scheduling information messages for each available carrier are time multiplexed onto a single carrier. To distinguish between different carriers it is possible to allocate transmission sequence numbers to each particular carrier. Such a method would not require any scheduling information message format change.

If, however, the carrier upon which those consecutive messages are transmitted is interrupted for any reason, and cannot reach the base station, information transmitted during that interruption is likely to be lost.

It may also be possible to send, on each carrier, an independent scheduling information message which contains an indication of estimated power available to send data on a data channel of only that carrier. However, if one carrier is interrupted then information relating the transmission of information on that carrier does not reach the base station.

The first aspect recognises that in order to optimise the chances of a base station receiving information relating to each and every carrier provided in a multi-carrier telecommunications network it can be most efficient to send the encoded scheduling information message relating to any given carrier on at least two carriers. Such an arrangement ensures that frequency diversity is fully utilised for each scheduling information message for each carrier. If transmissions on one carrier do not reach the base station for whatever reason, a scheduling information message relating to that carrier has been transmitted on at least one further carrier, thereby increasing the likelihood that the information will be received by the base station. The scheduling information message generated for a given carrier may, or may not, be transmitted on that carrier itself.

In one embodiment, the encoded scheduling information message for each carrier is transmitted to the base station on all carriers.

Transmission of the encoded scheduling information for each carrier to the base station on all carriers ensures that the chance of information being received at the base station is increased.

In one embodiment, each carrier transmits one, or only one, scheduling information message per predetermined transmit time interval. Accordingly, each carrier is equally loaded with encoded scheduling messages, and interruption of any given carrier is no more detrimental to the likelihood of those messages being received by the base station than interruption of any other carrier.

In one embodiment, transmission of the encoded scheduling information message for each carrier to the base station on two or more carriers occurs concurrently.

In one embodiment, transmission of the encoded scheduling information message for each carrier to the base station on two or more carriers occurs consecutively.

Consecutive transmission of the encoded scheduling information messages introduces time diversity. If a carrier is briefly interrupted, such that transmissions on that carrier do not reach the base station, it is possible that communication may be re-established by the time user equipment retransmits the scheduling information on a further carrier.

In one embodiment, commencement of transmission of the encoded scheduling information message for each carrier to the base station on said two or more carriers is off-set by a predetermined time period.

Offsetting commencement of transmission of said encoded scheduling information message for each carrier to the base station on said two or more carriers by a predetermined time period ensures that the scheduling information message for each carrier is fully multiplexed in both time and frequency. In such an arrangement, two or more independent scheduling information messages are sent, each on a different carrier, at a different time. Typically, the scheduling information messages are sent with a predetermined time delay or time shift relative to each other. That is to say, those scheduling information messages may be spaced apart in time. That time spacing is configurable and if it is larger than the channel coherent time, time diversity can be leveraged. The scheduling information messages may overlap in time, may be consecutive, as described above, or may be spaced apart as appropriate.

In one embodiment, the predetermined off-set time period comprises a fraction of a predetermined transmit time interval.

In one embodiment, the steps of:
generating an indication of the characteristic of the data to be transmitted;
determining an indication of estimated power available to send data on the data channel of each carrier, and
encoding a scheduling information message for each carrier, the scheduling information message being generated from the indication of estimated power available to send data on the channel of that carrier and the characteristic of the data to be transmitted, are repeated in the predetermined off-set time period Repetition of those steps in the off-set time period ensures that the information sent in each scheduling information message corresponds to the latest buffer information in the user equipment. The information to be sent from user equipment to a base station may change frequently as a user operates the user equipment. The user may, for example, wish to send further voice or text message information to a base station. Sending the scheduling information message in a time multiplexed manner in conjunction with a step of repetition of those steps listed above allows more frequent updates of user equipment buffer information (i.e. the characteristics of data to be transmitted) which therefore does not waste transmission bits. In particular, it can result in the most recent characteristics of said data to be transmitted being sent to the base station rather than out of date information, or the same information several times. Sending the same information several times may be considered a waste of transmission bits.

In one embodiment, the indication of the characteristic of the data to be transmitted comprises: an indication of a total quantity of data to be transmitted.

In one embodiment, the indication of the characteristic of the data to be transmitted comprises: an indication of highest priority data to be transmitted.

In one embodiment, the indication of the characteristic of the data to be transmitted comprises: an indication of a quantity of the highest priority data to be transmitted.

In one embodiment, the indication of the characteristic of the data to be transmitted comprises:
an indication of a total quantity of data to be transmitted, and
indication of highest priority data to be transmitted, and
an indication of a quantity of the highest priority data to be transmitted.

In one embodiment, the encoded scheduling information message for each carrier comprises 18 bits.

Utilising a known scheduling information message format in whole, or in part, ensures that no particular significant updates or changes are required at the base station. It will be appreciated, in particular, that ensuring the encoded scheduling information message comprises or consists of 18 bits will result in minimal changes to the wireless communication network system architecture. Furthermore, it can be seen that in a method in accordance with the first aspect, maintaining a scheduling information message of known length can help to ensure that the method is easily scalable to multi-carrier wireless telecommunications networks having any number of carriers.

In one embodiment, the indication of estimated power available to send data on the data channel of each carrier is encoded into 5 bits.

Ensuring that the indication of estimated power available to send data on said data channel of each carrier is encoded in to 5 bits ensures that the method of the first aspect is scalable to accommodate a wireless telecommunications network having any number of carriers without a need to change existing base station infrastructure.

In one embodiment, each carrier further comprises a pilot channel and the indication of estimated power available to send data on the data channel of each carrier comprises a ratio of user equipment available power for data transmission to power pre-allocated to the pilot channel of that carrier.

A pilot channel is also known as a 'dedicated physical control channel' or 'DPCCH'. The channels on which data is transmitted are known as 'E-DCH Dedicated Physical Data Channels' or 'E-DPDCH'.

The general operation of the carriers of user equipment are typically controlled by the user equipment based upon information and signals received from a base station. The pilot channel of a carrier acts as a dedicated physical control channel and is necessary to maintain contact between user equipment and a base station. The power allocated to the pilot channel is determined by the user equipment based on information received from the base station. The overall power control between user equipment and a base station to set the pilot channel of a carrier is known as "inner loop" power control. The inner loop power control process determines and pre-allocates a power level, from a user equipment power source, to each carrier independently.

If user equipment is close to the base station, or a carrier is experiencing a particularly advantageous radio transmission environment, the power pre-allocated to the pilot channel of that carrier will typically be relatively low. The power allocated to other channels provided on a carrier are typically controlled in relation to the pilot channel. It will thus be understood that the power level pre-allocated to the pilot channel by the inner loop power control process is likely to be representative of an estimated power requirement associated with sending data on the data channel of that carrier. That is to say, if a low power has been pre-allocated to the pilot channel of a carrier, a low power is required to maintain contact between that carrier and a base station. As a consequence, it is likely that carrier is experiencing an advantageous radio transmission environment and therefore that the power required to send data on that carrier will also be low.

Using the pilot channel pre-allocated power in combination with an indication of the user equipment available power to estimate power available to send data on said data channel is convenient and a reasonable approximation on which a base station can base resource allocation.

In one embodiment, the steps of the method are periodically repeated.

In one embodiment, the steps are repeated whenever there is new data to be transmitted from user equipment to the base station.

Ensuring that the method is repeated whenever there is new data to be transmitted ensures that any changes to the indication of the characteristics of the data to be transmitted and any change to the estimated power available to send data on said data channel of that carrier is the most up to date information available. The base station can then allocate resource in an appropriate manner, taking into account the most recent information received from the user equipment.

A second aspect provides user equipment operable to encode and transmit information relating to data to be transmitted from the user equipment to a base station in a multi-carrier wireless telecommunications network, each carrier comprising a data channel, the user equipment comprising:
  calculation logic operable to generate an indication of a characteristic of the data to be transmitted and determine an indication of estimated power available to send data on the data channel of each carrier,
  coding logic operable to encode a scheduling information message for each carrier, the scheduling information message being generated from the indication of estimated power available to send data on said data channel of that carrier and the characteristic of the data to be transmitted,
  implementation logic operable to transmit the encoded scheduling information message for each carrier to the base station on two or more carriers.

In one embodiment, the implementation logic is operable to transmit the encoded scheduling information message for each carrier to the base station on all carriers.

In one embodiment, the implementation logic is further operable to ensure each carrier transmits one scheduling information message per predetermined transmit time interval.

In one embodiment, the implementation logic is further operable to ensure each carrier transmits only one scheduling information message per predetermined time interval.

In one embodiment, the implementation logic is operable to transmit the encoded scheduling information message for each carrier to the base station on two or more carriers concurrently.

In one embodiment, the implementation logic is operable to transmit the encoded scheduling information message for each carrier to the base station on two or more carriers consecutively.

In one embodiment, the implementation logic is operable to commence transmission of the encoded scheduling information message for each carrier to the base station on the two or more carriers by a predetermined off-set time period.

In one embodiment, the predetermined off-set time period comprises a fraction of a predetermined transmit time interval.

In one embodiment, the user equipment further comprises repetition logic operable to instruct the calculation and coding logic to repeat the generation, determination and encoding steps within the predetermined off-set time period.

In one embodiment, the indication of the characteristic of the data to be transmitted comprises: an indication of a total quantity of data to be transmitted.

In one embodiment, the indication of the characteristic of the data to be transmitted comprises: an indication of highest priority data to be transmitted.

In one embodiment, the indication of the characteristic of the data to be transmitted comprises: an indication of a quantity of highest priority data to be transmitted.

In one embodiment, the indication of the characteristic of the data to be transmitted comprises:
  an indication of a total quantity of data to be transmitted, and
  an indication of highest priority data to be transmitted, and
  an indication of a total quantity of highest priority data to be transmitted.

In one embodiment, the encoded scheduling information message comprises 18 bits.

In one embodiment, the indication of estimated power available to send data on the data channel of each carrier is encoded into 5 bits.

In one embodiment, each carrier further comprises a pilot channel and the indication of estimated power available to send data on said data channel of each carrier comprises a ratio of user equipment available power for data transmission to power pre-allocated to the pilot channel of that carrier.

In one embodiment, the user equipment further comprises repetition logic, operable to repeat the steps of the first aspect periodically. The repetition logic may be triggered whenever there is data to be transmitted from user equipment to the base station. The repetition logic may be operable to repeat the step of generating the indication of the characteristic of said data to be transmitted, such that the encoded scheduling information message generated reflects the most up to date characteristic of said data to be transmitted.

A third aspect provides a computer program product, operable when executed on a computer, to perform the method steps of the first aspect.

Further particular and preferred aspects are set out in the accompanying and independent and dependent claims. Features of the dependent claims may be combined with the features of the independent claims as appropriate, and in combinations other than those explicitly set out in the claims.

BRIEF DESCRIPTION OF THE DRAWINGS

Embodiments of the present invention will now be described further, with reference to the accompanying drawings in which.

DESCRIPTION OF THE EMBODIMENTS

Figure 1:
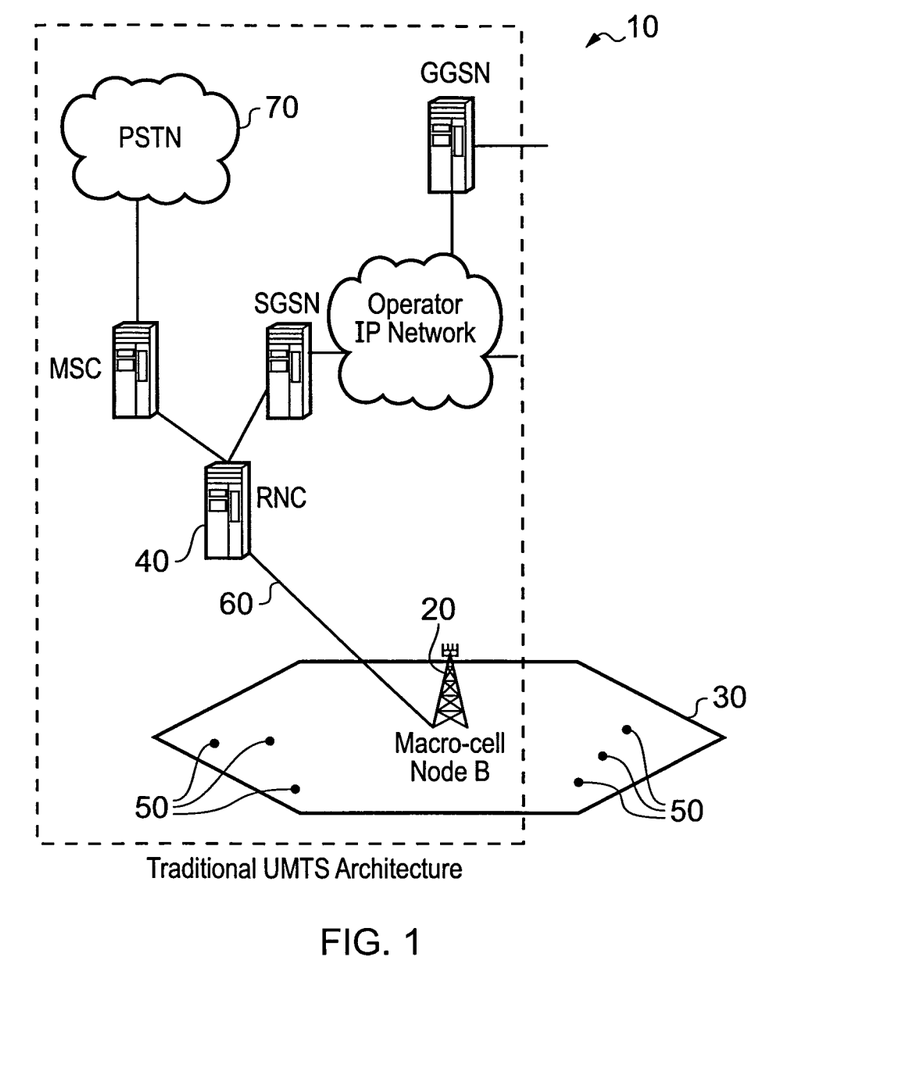
FIG. 1 illustrates the main components of telecommunications network according to one embodiment.

FIG. 1 illustrates a wireless communications system 10 according to one embodiment. User equipment 50 roam through the wireless telecommunications system. Base stations 20 are provided which support respective macro cells 30. A number of such base stations 20 are provided which are distributed geographically in order to provide a wide area of coverage to user equipment 50. When user equipment 50 is located within a macro cell 30 supported by a base station, communications may be established between the user equipment and the base station over an associated radio link. Each base station typically supports a number of sectors.

Typically, a different antenna within a base station supports an associated sector. Accordingly, each base station 20 has multiple antennas and signals sent through the different antennas are electronically weighted to provide a sectorised approach. Of course, it will be appreciated that FIG. 1 illustrates a small subset of the total number of user equipment and base stations that may be present in a typical communications system.

The wireless communications system is managed by a radio network controller (RNC) 40. The radio network controller 40 controls operation of the wireless communications system by communicating with a plurality of base stations over a backhaul communications link 60. The network controller also communicates with user equipment via the base station and thus effectively manage operation of the wireless communications system.

In a multi-carrier system, each sector served by a base station can have several carriers also known as "carrier frequencies" associated therewith. A carrier or cell covers the same geographical region as the sector. Each cell is served by a different carrier frequency. It will therefore be understood that in a single carrier system a cell is equivalent to a sector since a sector only has one cell or carrier frequency. A base station in a multi-carrier system is operable to simultaneously transmit on more that one carrier.

The radio network controller 40 maintains a neighbour list which includes information about geographical relationship between sectors supported by base stations 20. In addition, the radio network controller 40 maintains location information which provides information regarding the location of user equipment 50 within the wireless communications system 10. The radio network controller 40 is operable to route traffic via circuit switched and packet switched networks. Hence, a mobile switching centre is provided with which the radio network controller may communicate. The mobile switching centre can communicate with a circuit switch network such as a public switched telephone network (PSTN) 70. Similarly, the network controller communicates with service general package radio service support nodes (SGSNs) and a gateway general packet support node (GGSN). The GGSN can communicate with a packet switch core such as for example, the Internet.

User equipment 50 typically transmit information and data to a base station 20 so that it can be re-routed within the wireless telecommunications network. User equipment may, for example, need to transmit data to the base station in order to relay text messages, voice information when a user is using equipment to make a telephone call, or other data.

The base station 20, in combination with parameters set by the radio network controller 40, allocates resource to user equipment in a manner that aims to optimise operation of the wireless telecommunications network 10.

Figure 2:
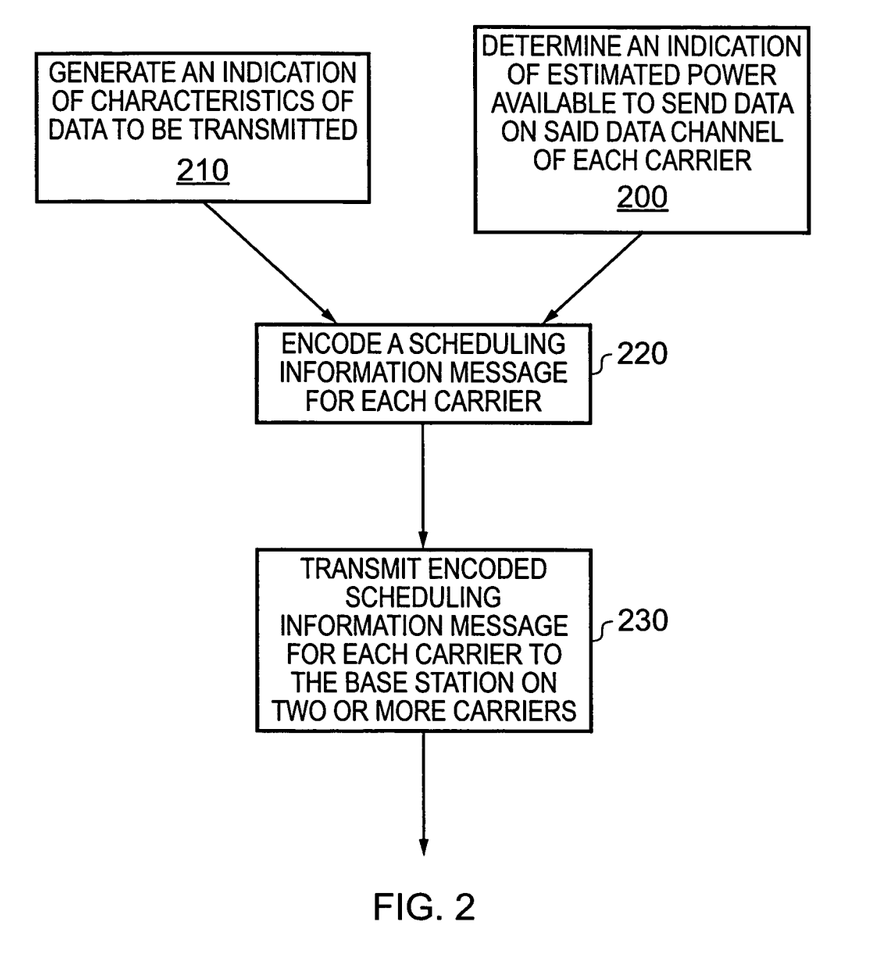
FIG. 2 is a schematic representation of the main processing steps for encoding and transmitting information relating to data to be transmitted from user equipment to a base station in a multi-carrier wireless telecommunications network in accordance with one aspect.
Figure 3:
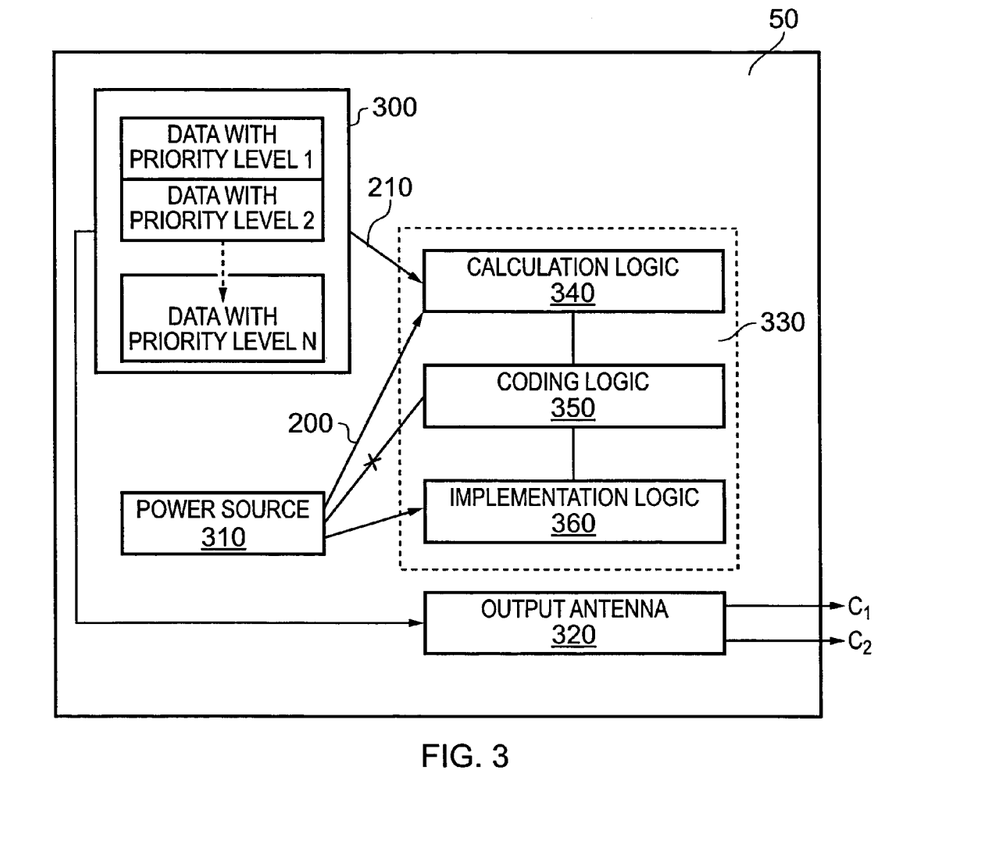
FIG. 3 is a schematic representation of user equipment including logic operable to carry out a method of encoding and transmitting information relating to data to be transmitted from user equipment to a base station in a multi-carrier wireless telecommunications network in accordance with one aspect.
Figures 4A, 4B:
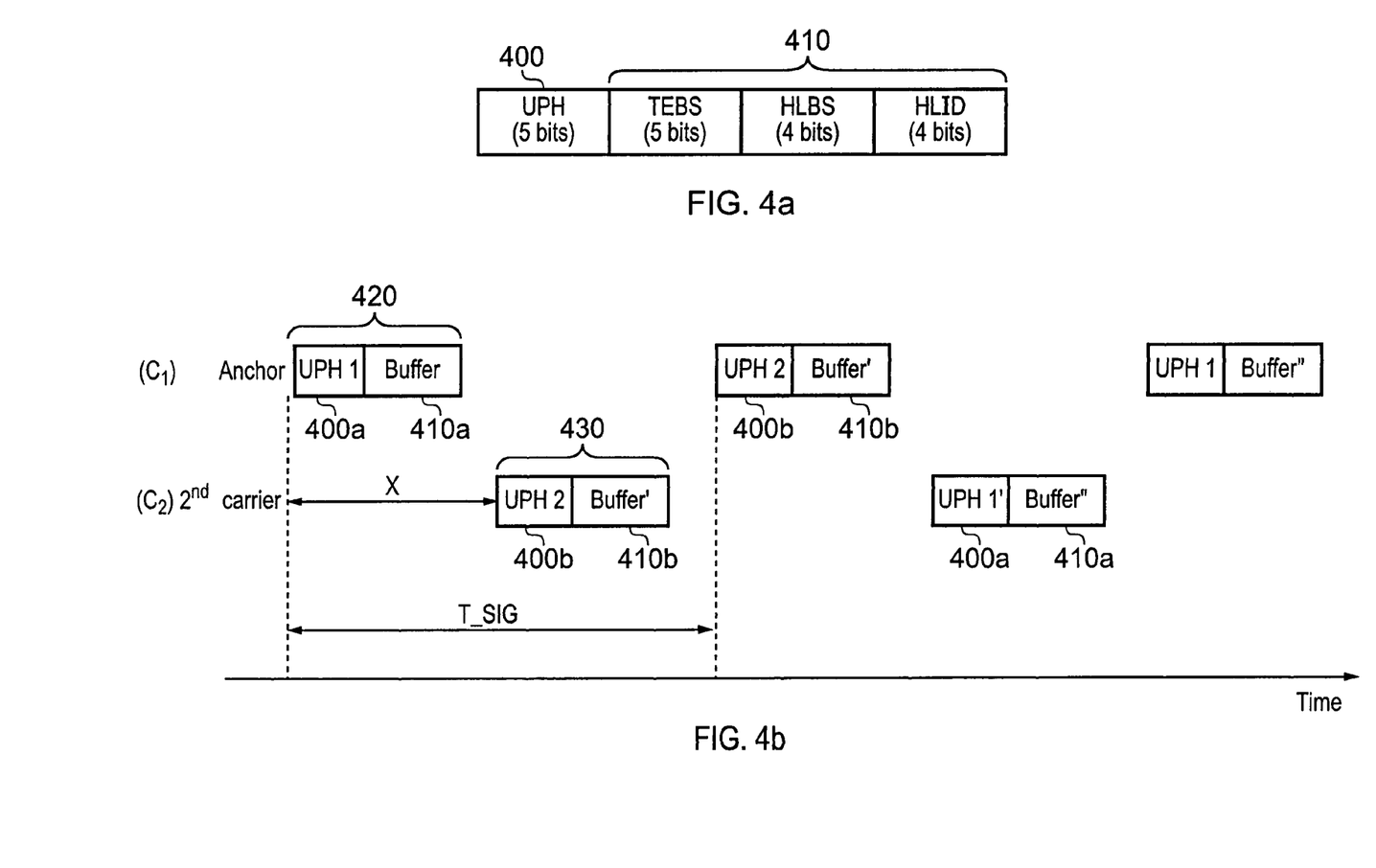
FIG. 4a is a schematic illustration of a scheduling information message and FIG. 4b is an illustrated example of one implementation of a method of encoding and transmitting information relating to data to be transmitted to user equipment to a base station in a multi-carrier wireless telecommunications network.

An embodiment of aspects described herein will now be explained with reference to the following drawings in which:

FIG. 2 is a schematic representation of the main processing steps for encoding and transmitting information relating to data to be transmitted from user equipment to a base station in a multi-carrier wireless telecommunications network in accordance with one aspect;

FIG. 3 is a schematic representation of user equipment including logic operable to carry out a method of encoding and transmitting information relating to data to be transmitted from user equipment to a base station in a multi-carrier wireless telecommunications network in accordance with one aspect; and FIG. 4a is a schematic illustration of a scheduling information message and FIG. 4b is an illustrated example of one implementation of a method of encoding and transmitting information relating to data to be transmitted to user equipment to a base station in a multi-carrier wireless telecommunications network.

FIG. 3 shows schematically user equipment 50. User equipment 50 comprises generally data store 300, a power source 310, output antenna 320 and controller logic 330. When user equipment 50 has data to send to a base station 20 that data forms part of data store 300. More specifically, the data to be transmitted to a base station 20 is collected in data store 300 in order of priority. The priority allocated to given data will depend upon, for example, whether that data relates to voice information to be transferred to a base station, text message information to be transferred to a base station or other data to be transmitted to a base station. It can thus be understood that data store 300 is essentially a set of data stores. Data to be transmitted to the base station is sorted into quantities in order of priority allocated to that data.

The user equipment 50 also comprises power source 310. Power source 310 may, for example, comprise a battery and a power amplifier and that power source allows the user equipment 50 to perform various functions. Controller logic 330 of the user equipment 50 controls operation of the user equipment. In particular, the controller logic further comprises calculation logic 340, coding logic 350 and implementation logic 360.

Output antenna 320 is operable to transmit a radio signal to base station 20. In the illustrated embodiment, output antenna 320 is capable of transmitting on two carrier frequencies illustrated schematically by the arrows in FIG. 3 and allocated reference numerals C1 and C2. Typically, one of those carrier frequencies is referred to as the anchor frequency (in this case C1).

Controller logic 330 is operable to carry out a method described in more detail in relation to FIG. 2.

Information and data transmitted by a base station 20 to user equipment 50 occurs on channels of radio carriers known as downlink carriers. Information and data transmitted by user equipment to the base station located on uplink data channels of radio carriers known as uplink carriers. In the particular embodiment shown, user equipment transmits data to the base station in packets. In this embodiment one or more E-DCH dedicated physical data channels (E-DPDCH) are used to carry data from user equipment to a base station. Data throughput of user equipment is determined by transport block size carried by the one or more E-DPDCH channels per transport time interval (TTI). The transport block size sustainable on a given data channel is dependent upon an allocated amount of power which that user equipment has been granted permission to use by a base station. More particularly, the amount of power the user equipment is allowed to use in a particular channel is determined by the base station 20 in conjunction with the RNC 40. The RNC 40 sets the parameters within which the network 10 is to operate and the base station 20 communicates with user equipment 50 to dictate the operation of user equipment 50 to meet parameters set by the RNC 40.

In order to allocate a power, and therefore a transport block size, to a given user equipment 50 a base station 20 collects initial information from that user equipment 50. The method of sending information from the user equipment to the base station for this task is described in relation to FIG. 2.

The information sent from the user equipment to a base station 20 in order to allocate resource to user equipment is known as a scheduling information (SI) message. In order to generate a scheduling information message in accordance with the present invention the following steps occur: calculation logic 340 of user equipment 50 acts to determine an indication of estimated power available to send data on the data channel of each available carrier. In the embodiment shown there are two carriers C1 and C2. The step of determining an indication of estimated power (step 200 in FIG. 2) comprises the step of calculating what is known as the user equipment power headroom (UPH). Each carrier, C1, C2 of user equipment 50 comprises a pilot channel. A pilot channel is also known as a "dedicated physical control channel" or "DPCCH". The channels on which data is transmitted are known as "E-DCH dedicated physical control channels" or "E-DPDCH".

The pilot channel of a carrier acts as a dedicated physical control channel and is necessary to maintain contact between user equipment and a base station. The power allocated to the pilot channel is determined by the user equipment 50 based on information received from a base station 20. The overall power control between user equipment and a base station to set the pilot channel of a carrier is known as "inner loop" power control. The inner loop power control process determines and pre-allocates the power level, from the user equipment power source 310, to each carrier C1, C2 independently.

The user equipment power headroom (UPH) is an indication of the remaining power from power source 310 (expressed as a ratio to the pilot channel pre-allocated power) that the user equipment 50 can use for enhanced dedicated channel data transmission.

Calculation logic 40 also operates to generate an indication of characteristics of the data to be transmitted from user equipment 50 to a base station 20. That generation of an indication of characteristics occurs at step 210 of FIG. 2.

In the embodiment shown in FIGS. 2, 3 and 4b the indication of characteristics of data to be transmitted comprises three pieces of information. That information is generated by calculation logic 340 in step 210 by communicating with data store 300. Those three pieces of information generated includes the total E-DCH buffer status (TEBS), which indicates the total amount of data in the user equipment 50, data store 300. The indication of characteristics also includes an indication of the highest priority logical channel ID (HUD) which indicates the highest priority logical channel which has data in data store 300. It may be, for example, that there is no voice information to be transmitted and that all data in data store 300 has a lower priority. The HUD indicates the logical channel which has the highest priority and contains data. Finally, the characteristics of the data to be transmitted include an indication of how much data is in that highest logical channel indicated in HUD. This piece of information is known as the highest priority logical channel buffer status (HLBS).

Collectively TEBS, HLBS and HUD are known as the user equipment buffer information. In this embodiment, it is the user equipment buffer information that is generated at step 210.

Coding logic 350 of user equipment controller logic 330 is operable to execute step 220 of the method shown in FIG. 2. The scheduling information generated for each carrier by coding logic 350 in method step 220 has a very particular format. In this embodiment, the total size of the scheduling information message generated is 18 bits. 5 bits are dedicated to UPH. The remaining 13 bits are dedicated to the user equipment buffer information that is to be say TEBS (5 bits), HLBS (4 bits) and HUD (4 bits).

It will be understood from FIG. 3 in particular that carriers C1 and C2 share the same user equipment data store 300. That is to say, it is likely that the user equipment buffer information (TEBS, HLBS and HUD) will be common for the scheduling information message generated for each of carriers C1 and C2. The user equipment power headroom (UPH) is likely to be different for each carrier C1 and C2. That it is to say, step 200 is likely to be different for each of carriers C1 and C2. The particular format of a scheduling information message generated by this embodiment is shown in general in FIG. 4a and has been described above. The 18 bit message shown in FIG. 4a comprises UPH information 400 and user equipment buffer information 410.

Once coding logic 350 of user equipment 50 has encoded a scheduling information message for each carrier, implementation logic 360 is operable to ensure that user equipment 50 transmits the encoding scheduling information for each carrier to the base station on two or more carriers. That method step 230 is carried out by the implementation logic 360. Implementation logic 360 sends suitable signals to power source 310 and data store 300 such that they communicate with output antenna 320 to send the encoded scheduling information messages (for each carrier) on both carriers as shown in FIG. 4b.

FIG. 4b shows schematically how the user equipment of FIG. 3 might operate to transmit the encoded scheduling information signals for each carrier. FIG. 4b shows a time and frequency multiplexed scheduling information message reporting scheme. In this solution, two independent scheduling information messages 420, 430 are sent. One scheduling information message is sent on each carrier. The scheduling information messages 420, 430 are sent with X transmit time intervals therebetween. The value X is configurable and if it is larger than channel coherent time, time diversity can be leveraged in addition to frequency diversity. The buffer information 410a and 410b sent on each scheduling information message 420, 430 can correspond to the latest user equipment buffer information in the data store 300. If scheduling information messages are sent periodically, it allows more frequent updates of buffer information to a base station 20 and therefore arguably does not waste any transmission bits. Frequency diversity for the UPH information 400a and 400b is achieved by alternating 400a and 400b in the message on each carrier as shown in FIG. 4b.

The method shown utilises time and frequency diversity. Furthermore, it does not require a format change of the scheduling information and message compared to that already known in order to transmit relevant information. It can be seen that this particular embodiment has been used in relation to only two carriers but the method is easily scalable to a multi-carrier packet network. In the embodiment shown in FIG. 4b, the scheduling information for a particular piece of user equipment 50 is set to transmit periodically once every predetermined transmit time interval (T_SIGTTI). In this case, commencement of transmissions on carriers is off-set by a time period, X. The updated information is indicated by "Buffer', UPH' and Buffer'"". In this case, X is set to T_SIG/2 but in general the off-set is configurable and does not have to be this value. In this embodiment the user equipment buffer information 410a and 410b is updated every T_SIG/2 even though each carrier still sends one scheduling information message every T_SIGTTI, because the step of re-determining user equipment buffer information and user equipment power headroom for each carrier is repeated and encoding a scheduling information message is repeated in time period X.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of encoding and transmitting information relating to data to be transmitted from user equipment to a base station in a multi-carrier wireless telecommunications network, at least one carrier comprising a data channel, said method comprising:
generating an indication of one or more characteristics of said data to be transmitted, wherein at least one characteristic is user equipment buffer information;
determining an indication of estimated power available to send data on said data channel of said at least one carrier;
encoding a scheduling information message for said at least one carrier, said scheduling information message being generated from the indication of estimated power available to send data on said data channel of said at least one carrier and the one or more characteristics of said data to be transmitted;
transmitting said encoded scheduling information message for said at least one carrier to the base station on two or more carriers.

2. The method according to claim 1, wherein said at least one carrier transmits one scheduling information message per predetermined transmit time interval.

3. The method according to claim 1, wherein said encoded scheduling information message for said at least one carrier is transmitted to the base station on said carriers.

4. The method according to claim 1, wherein transmission of said encoded scheduling information message for said at least one carrier to the base station on two or more carriers occurs concurrently.

5. The method according to claim 1, wherein transmission of said encoded scheduling information message for said at least one carrier to the base station on two or more carriers occurs consecutively.

6. The method according to claim 1, wherein commencement of transmission of said encoded scheduling information message for said at least one carrier to the base station on said two or more carriers is off-set by a predetermined time period.

7. The method according to claim 6, wherein said predetermined off-set time period comprises a fraction of a predetermined transmit time interval.

8. The method according to claim 6 wherein said:
generating an indication of the one or more characteristics of said data to be transmitted;
determining an indication of estimated power available to send data on said data channel of said at least one carrier, and
encoding a scheduling information message for said at least one carrier, said scheduling information message being generated from the indication of estimated power available to send data on said channel of said at least one carrier and the one or more characteristics of said data to be transmitted,
are repeated in said predetermined off-set time period.

9. The method according to claim 1, wherein said indication of the one or more characteristics of said data to be transmitted comprises:
an indication of a quantity of total data to be transmitted, or an indication of highest priority data to be transmitted, or an indication of a quantity of the highest priority data to be transmitted.

10. The method according to claim 1, wherein each said encoded scheduling information message comprises 18 bits.

11. The method according to claim 1, wherein said indication of estimated power available to send data on said data channel of said at least one carrier is encoded into 5 bits.

12. The method according to claim 1, wherein said at least one carrier further comprises a pilot channel and said indication of estimated power available to send data on said data channel of said at least one carrier comprises a ratio of user equipment available power for data transmission to power pre-allocated to the pilot channel of said at least one carrier.

13. The method according to claim 1, wherein generating an indication of the one or more characteristics of said data to be transmitted, determining an indication of estimated power available to send data on said data channel of said at least one carrier, encoding a scheduling information message for said at least one carrier, and transmitting said encoded scheduling information message for said at least one carrier to the base station on two or more carriers are periodically repeated.

14. User equipment operable to encode and transmit information relating to data to be transmitted from said user equipment to a base station in a multi-carrier wireless telecommunications network, at least one carrier comprising a data channel, said user equipment comprising:
a controller operable to generate an indication of the characteristics of said data to be transmitted, and determine an indication of estimated power available to send data on said data channel of said at least one carrier, wherein at least one characteristic is user equipment buffer information,
the controller being operable to encode a scheduling information message for said at least one carrier, said scheduling information message being generated from the indication of estimated power available to send data on said data channel of said at least one carrier and the characteristics of said data to be transmitted,
the controller being further operable to transmit said encoded scheduling information message for said at least one carrier to the base station on two or more carriers.

15. A non-transitory computer-usable data carrier storing instructions that, when executed by a computer, cause the computer to perform a method of encoding and transmitting information relating to data to be transmitted from user equipment to a base station in a multi-carrier wireless telecommunications network, at least one carrier comprising a data channel, said method comprising:
generating an indication of one or more characteristics of said data to be transmitted, wherein at least one characteristic is user equipment buffer information;
determining an indication of estimated power available to send data on said data channel of said at least one carrier;
encoding a scheduling information message for said at least one carrier, said scheduling information message being generated from the indication of estimated power available to send data on said data channel of said at least one carrier and the one or more characteristics of said data to be transmitted;
transmitting said encoded scheduling information message for said at least one carrier to the base station on two or more carriers.

16. A method of encoding and transmitting information relating to data to be transmitted from user equipment to a base station in a multi-carrier wireless telecommunications network, at least one carrier comprising a data channel, said method comprising:
generating an indication of one or more characteristics of said data to be transmitted;
determining an indication of estimated power available to send data on said data channel of said at least one carrier;
encoding a scheduling information message for said at least one carrier, said scheduling information message being generated from the indication of estimated power available to send data on said data channel of said at least one carrier and the characteristic of said data to be transmitted;
transmitting said encoded scheduling information message for said at least one carrier to the base station on two or more carriers, wherein said at least one carrier further comprises a pilot channel and said indication of estimated power available to send data on said data channel of said at least one carrier comprises a ratio of user equipment available power for data transmission to power pre-allocated to the pilot channel of said at least one carrier.

* * * * *